US012137318B2

(12) United States Patent
Fujii et al.

(10) Patent No.: US 12,137,318 B2
(45) Date of Patent: Nov. 5, 2024

(54) PROCESSING DEVICE AND PROCESSING METHOD

(71) Applicant: JVCKENWOOD Corporation, Yokohama (JP)

(72) Inventors: Yumi Fujii, Yokohama (JP); Takahiro Gejo, Yokohama (JP); Hisako Murata, Yokohama (JP)

(73) Assignee: JVCKENWOOD Corporation, Yokohama (JP)

( * ) Notice: Subject to any disclaimer, the term of this patent is extended or adjusted under 35 U.S.C. 154(b) by 203 days.

(21) Appl. No.: 17/859,249

(22) Filed: Jul. 7, 2022

(65) Prior Publication Data

US 2023/0045207 A1 Feb. 9, 2023

(30) Foreign Application Priority Data

Aug. 6, 2021 (JP) ................................. 2021-130086

(51) Int. Cl.
*H04R 1/10* (2006.01)
*H04R 5/033* (2006.01)
*H04S 1/00* (2006.01)

(52) U.S. Cl.
CPC ........... *H04R 1/1083* (2013.01); *H04R 5/033* (2013.01); *H04S 1/007* (2013.01); *H04S 2400/15* (2013.01)

(58) Field of Classification Search
CPC ....... H04R 1/1083; H04R 5/033; H04S 1/007; H04S 2400/15
USPC ........... 381/58, 26, 74, 98, 310, 92, 56, 122; 700/94
See application file for complete search history.

(56) References Cited

U.S. PATENT DOCUMENTS

| | | | | |
|---|---|---|---|---|
| 9,432,766 | B2 * | 8/2016 | Jensen | G10L 21/0208 |
| 2008/0012579 | A1 * | 1/2008 | Kuhns | G06K 19/0717 324/652 |
| 2012/0263315 | A1 * | 10/2012 | Hiroe | G10L 21/0216 381/92 |
| 2015/0155842 | A1 * | 6/2015 | Shuttleworth | H03G 11/04 381/98 |
| 2018/0140233 | A1 * | 5/2018 | Lacirignola | A61B 5/6814 |
| 2021/0377684 | A1 | 12/2021 | Gejo et al. | |

FOREIGN PATENT DOCUMENTS

| | | |
|---|---|---|
| JP | 2020136752 A | 8/2020 |

* cited by examiner

*Primary Examiner* — Vivian C Chin
*Assistant Examiner* — Con P Tran
(74) *Attorney, Agent, or Firm* — Procopio, Cory, Hargreaves & Savitch LLP

(57) ABSTRACT

A processing device according to this embodiment includes: a frequency characteristics acquisition unit configured to acquire frequency characteristics of an input signal; an extreme value extraction unit configured to extract an extreme value of spectral data; a kurtosis calculation unit configured to: calculate an evaluation value from spectral data; and calculate a kurtosis of a peak or a dip based on a plurality of evaluation values calculated by changing a calculation width, the evaluation value being used for evaluating the peak or the dip corresponding to the extreme value; a determination unit configured to determine whether to suppress the peak or the dip according to a comparison result between the kurtosis and a threshold value; and a suppression unit configured to suppress the peak or the dip with the extreme value that is determined to be suppressed.

4 Claims, 8 Drawing Sheets

PROCESSING DEVICE AND PROCESSING METHOD

CROSS REFERENCE TO RELATED APPLICATION

This application is based upon and claims the benefit of priority from Japanese patent application No. 2021-130086, filed on Aug. 6, 2021, the disclosure of which is incorporated herein in its entirety by reference.

BACKGROUND

The present disclosure relates to a processing device and a processing method.

Sound localization techniques include an out-of-head localization technique, which localizes sound images outside the head of a listener by using headphones. The out-of-head localization technique works to cancel out characteristics from headphones to the ears (headphone characteristics), and to give two characteristics from one speaker (monaural speaker) to the ears (spatial acoustic transfer characteristics). This localizes the sound images outside the head.

In out-of-head localization reproduction with a stereo speaker, measurement signals (impulse sounds etc.) that are output from 2-channel (which is referred to hereinafter as "ch") speakers are recorded by microphones (which can be also called "mike") placed on the listener's ears. Then, the processing device generates a filter based on a sound pickup signal obtained by picking up the measurement signal. The generated filter is convolved to 2ch audio signals, thereby implementing out-of-head localization reproduction.

In addition, to generate a filter to cancel out headphone-to-ear characteristics, which is called an inverse filter, characteristics from the headphones to a vicinity of the ear or the eardrum (also referred to as ear canal transfer function ECTF, or ear canal transfer characteristics) are measured with a microphone placed in the listener's ear.

Patent Literature 1 (Japanese Unexamined Patent Application Publication No. 2020-136752) discloses an out-of-head localization processing device that performs out-of-head localization processing using a filter. In Patent Literature 1, a measurement microphone placed in the user's ear canal picks up an impulse sound. As a result, the ear canal transfer characteristics from the speaker unit of the headphones to the microphone are measured.

SUMMARY

In performing out-of-head localization processing, it is preferable to measure the characteristics with a microphone installed in the listener's ear. In measuring the ear canal transfer characteristics, impulse response measurement is carried out with a microphone and headphones worn on the listener's ear. Using the characteristics of the listener allows generating a filter suitable for the listener. For such filter generation and the like, it is desired to appropriately process the sound pickup signal obtained by the measurement.

The inverse filter is generated by an algorithm such as the least squares method, but it is difficult to create a perfect inverse characteristics at all frequencies due to the characteristics of the algorithm. In addition, if the ECTF itself has a steep peak or dip, the inverse characteristics thereof are generated so that the inverse filter has a steep dip or peak there. Further, if an inverse filter is generated at a position where the control points of the sound field for out-of-head localization reproduction are different, an unintended peak may occur.

Additionally, if the user rewears the headphones, the frequency at which the peak occurs may be different between before and after the rewearing. This may adversely affect the localization and the balance of sound quality. Ideally, the ECTF should be measured each time the user rewears the headphones, but this imposes a burden on the user. Therefore, it is desirable to suppress steep peaks and dips of frequency characteristics, obtained by user measurement, in advance.

A processing device according to an embodiment includes: a frequency characteristics acquisition unit configured to acquire frequency characteristics of an input signal; an extreme value extraction unit configured to extract an extreme value of spectral data based on the frequency characteristics; a kurtosis calculation unit configured to: calculate an evaluation value from spectral data in a calculation width including the extreme value; and calculate a kurtosis of a peak or a dip based on a plurality of evaluation values calculated by changing the calculation width, the evaluation value being used for evaluating the peak or the dip corresponding to the extreme value; a determination unit configured to determine whether to suppress the peak or the dip according to a comparison result between the kurtosis and a threshold value; and a suppression unit configured to suppress the peak or the dip, the peak or the dip having the extreme value determined to be suppressed.

A processing method according to an embodiment includes: a step of acquiring frequency characteristics of an input signal; a step of extracting an extreme value of the frequency characteristics; a step of: calculating an evaluation value from data in a calculation width including the extreme value; and calculating a kurtosis of the extreme value based on a plurality of evaluation values calculated by changing the calculation width, the evaluation value being used for evaluating the extreme value; a step of determining whether to suppress the extreme value according to a comparison result between the kurtosis and a threshold value; and a step of suppressing the extreme value determined to be suppressed.

The present disclosure can provide a processing device and a processing method capable of appropriately suppressing a peak or a dip.

BRIEF DESCRIPTION OF THE DRAWINGS

The above and other aspects, advantages and features will be more apparent from the following description of certain embodiments taken in conjunction with the accompanying drawings, in which.

DETAILED DESCRIPTION

The overview of a sound localization processing according to an embodiment is described hereinafter. The out-of-head localization processing according to this embodiment performs out-of-head localization processing by using spatial acoustic transfer characteristics and ear canal transfer characteristics. The spatial acoustic transfer characteristics are transfer characteristics from a sound source such as speakers to an ear canal. The ear canal transfer characteristics are transfer characteristics from the speaker unit of headphones or earphones to the eardrum. In this embodiment, the spatial acoustic transfer characteristics are measured without headphones or earphones being worn, and the ear canal transfer characteristics are measured with headphones or earphones being worn, so that out-of-head localization processing is implemented using these measurement data. This embodiment is characterized by a microphone system for measuring spatial acoustic transfer characteristics or ear canal transfer characteristics.

The out-of-head localization processing according to this embodiment is executed on a user terminal such as a personal computer, a smart phone, or a tablet PC. The user terminal is an information processing device including processing means such as a processor, storage means such as a memory or a hard disk, display means such as a liquid crystal monitor, and input means such as a touch panel, a button, a keyboard and a mouse. The user terminal may have a communication function to transmit and receive data. Further, the user terminal is connected to output means (output unit) with headphones or earphones. The connection between the user terminal and the output means may be a wired connection or a wireless connection.

First Embodiment

Out-of-Head Localization Processing Device

Figure 1:
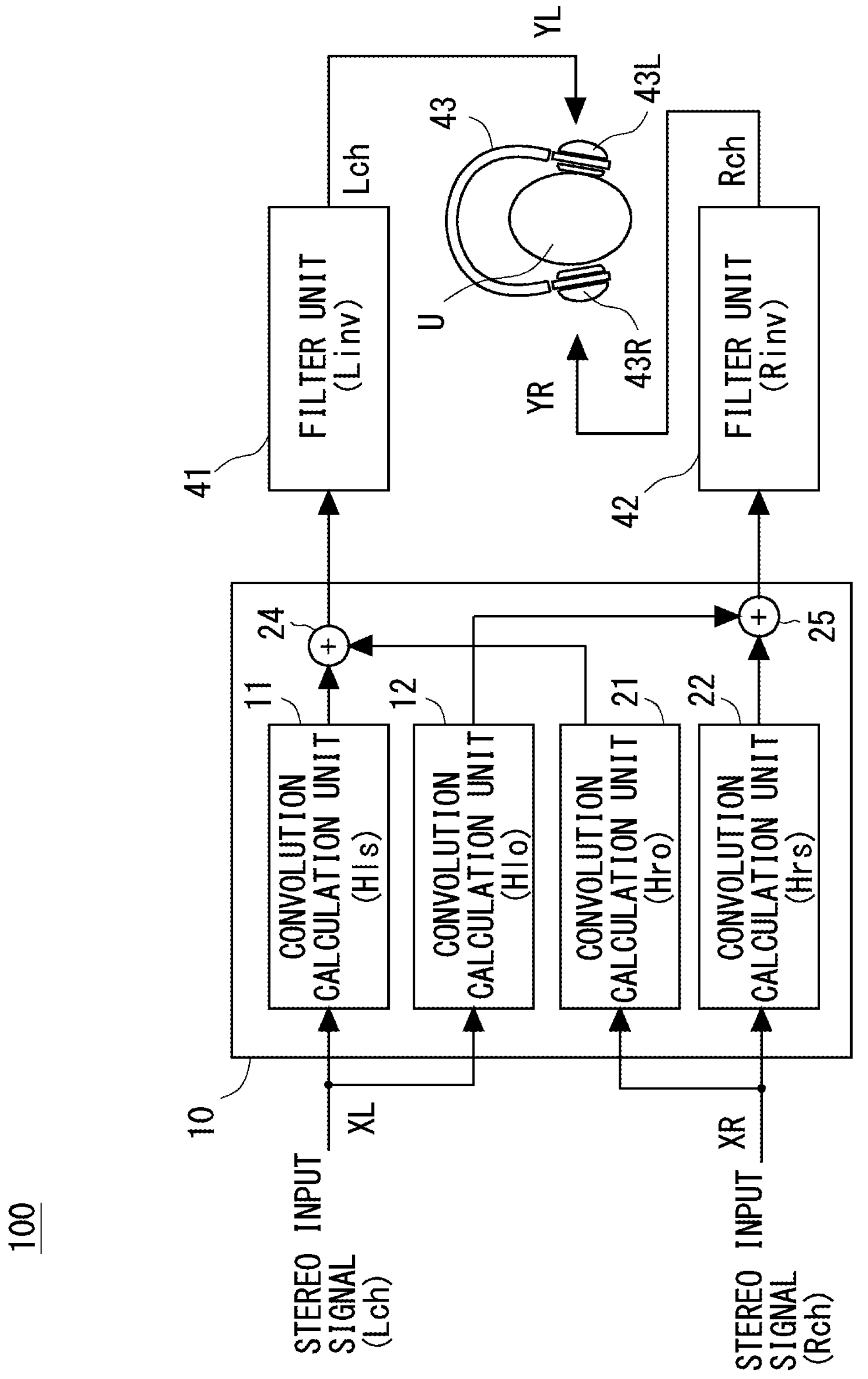
FIG. 1 is a block diagram showing an out-of-head localization processing device according to an embodiment.

FIG. 1 shows a block diagram of the out-of-head localization processing device 100, which is an example of a sound field reproducing device according to this embodiment. The out-of-head localization processing device 100 reproduces a sound field for the user U who wears the headphones 43. Thus, the out-of-head localization processing device 100 performs sound localization processing for L-ch and R-ch stereo input signals XL and XR. The L-ch and R-ch stereo input signals XL and XR are analog audio reproduced signals that are output from a CD (Compact Disc) player or the like or digital audio data such as mp3 (MPEG Audio Layer-3). Note that the audio reproduced signals or digital audio data are collectively referred to as a reproduced signal. Specifically, the stereo input signals XL and XR of L-ch and R-ch are reproduced signals.

Note that the out-of-head localization processing device 100 is not limited to a physically single device, and a part of processing may be performed in a different device. For example, a part of the processing may be performed by a smart phone or the like, and the remaining processing may be performed by a DSP (Digital Signal Processor) built in the headphones 43 or the like.

The out-of-head localization processing device 100 includes an out-of-head localization unit 10, a filter unit 41 for storing an inverse filter Linv, a filter unit 42 for storing an inverse filter Rinv, and headphones 43. The out-of-head localization unit 10, the filter unit 41, and the filter unit 42 can be specifically implemented by a processor or the like.

The out-of-head localization unit 10 includes convolution calculation units 11 to 12 and 21 to 22 for storing the spatial acoustic transfer characteristics Hls, Hlo, Hro, and Hrs, and adders 24, 25. The convolution calculation units 11 to 12 and 21 to 22 perform convolution processing using the spatial acoustic transfer characteristics. The stereo input signals XL and XR from a CD player or the like are input to the out-of-head localization unit 10. The spatial acoustic transfer characteristics are set to the out-of-head localization unit 10. The out-of-head localization unit 10 convolves a filter of the spatial acoustic transfer characteristics (which is hereinafter referred to also as a spatial acoustic filter) into each of the stereo input signals XL and XR. The spatial acoustic transfer characteristics may be a head-related transfer function HRTF measured in the head or auricle of a measured person, or may be the head-related transfer function of a dummy head or a third person.

The spatial acoustic transfer function is a set of four spatial acoustic transfer characteristics Hls, Hlo, Hro and Hrs. Data used for convolution in the convolution calculation units 11 to 12 and 21 to 22 is a spatial acoustic filter. The spatial acoustic filter is generated by cutting out the spatial acoustic transfer characteristics Hls, Hlo, Hro and Hrs with a specified filter length.

Each of the spatial acoustic transfer characteristics Hls, Hlo, Hro and Hrs is acquired in advance by impulse response measurement or the like. For example, the user U wears microphones on the left and right ears, respectively. Left and right speakers placed in front of the user U output impulse sounds for performing impulse response measurements. Then, the measurement signals such as the impulse sounds output from the speakers are picked up by the microphones. The spatial acoustic transfer characteristics Hls, Hlo, Hro and Hrs are acquired based on sound pickup signals in the microphones. The spatial acoustic transfer characteristics Hls between the left speaker and the left microphone, the spatial acoustic transfer characteristics Hlo between the left speaker and the right microphone, the spatial acoustic transfer characteristics Hro between the right speaker and the left microphone, and the spatial acoustic transfer characteristics Hrs between the right speaker and the right microphone are measured.

The convolution calculation unit 11 convolves the spatial acoustic filter in accordance with the spatial acoustic transfer characteristics Hls to the L-ch stereo input signal XL. The convolution calculation unit 11 outputs convolution calculation data to the adder 24. The convolution calculation unit 21 convolves the spatial acoustic filter in accordance with the spatial acoustic transfer characteristics Hro to the R-ch stereo input signal XR. The convolution calculation unit 21 outputs convolution calculation data to the adder 24. The adder 24 adds the two convolution calculation data and outputs the data to the filter unit 41.

The convolution calculation unit 12 convolves the spatial acoustic filter in accordance with the spatial acoustic transfer characteristics Hlo to the L-ch stereo input signal XL. The convolution calculation unit 12 outputs the convolution calculation data to the adder 25. The convolution calculation unit 22 convolves the spatial acoustic filter in accordance with the spatial acoustic transfer characteristics Hrs to the R-ch stereo input signal XR. The convolution calculation unit 22 outputs convolution calculation data to the adder 25. The adder 25 adds the two convolution calculation data and outputs the data to the filter unit 42.

Inverse filters Linv and Rinv for canceling out the headphone characteristics (characteristics between the headphone reproduction units and the microphones) are set in the filter units 41 and 42. Then, the inverse filters Linv and Rinv are convolved into the reproduced signals (convolution calculation signals) on which processing in the out-of-head localization unit 10 has been performed. The filter unit 41 convolves the inverse filter Linv of the L-ch headphone characteristics to the L-ch signal from the adder 24. Likewise, the filter unit 42 convolves the inverse filter Rinv of the R-ch headphone characteristics to the R-ch signal from the adder 25. The inverse filters Linv and Rinv cancel out the characteristics from the headphone units to the microphones when the headphones 43 are worn. The microphones each may be placed at any position between the entrance of the ear canal and the eardrum.

The filter unit 41 outputs the processed L-ch signal YL to the left unit 43L of the headphones 43. The filter unit 42 outputs the processed R-ch signal YR to the right unit 43R of the headphones 43. The user U wears the headphones 43. The headphones 43 output the L-ch signal YL and the R-ch signal YR (hereinafter, the L-ch signal YL and the R-ch signal YR are collectively referred to as a stereo signal) toward the user U. As a result, sound images localized outside the head of the user U can be reproduced.

As described above, the out-of-head localization processing device 100 performs out-of-head localization using the spatial acoustic filters in accordance with the spatial acoustic transfer characteristics Hls, Hlo, Hro, and Hrs, and the inverse filters Linv and Rinv of the headphone characteristics. In the following description, the spatial acoustic filters corresponding to the spatial acoustic transfer characteristics Hls, Hlo, Hro, and Hrs, and the inverse filters Linv and Rinv of the headphone characteristics are collectively referred to as an out-of-head localization processing filter. In the case of 2ch stereo reproduced signals, the out-of-head localization filter is composed of four spatial acoustic filters and two inverse filters. The out-of-head localization processing device 100 then carries out convolution calculation on the stereo reproduced signals by using the total six out-of-head localization filters and thereby performs out-of-head localization. The out-of-head localization filter is preferably based on the measurement of the individual user U. For example, the out-of-head localization filter is set based on sound pickup signals picked up by the microphones worn on the ears of the user U.

In this way, the spatial acoustic filters, and the inverse filters Linv and Rinv for headphone characteristics are filters for audio signals. These filters are convolved into the reproduced signals (stereo input signals XL and XR), and thereby the out-of-head localization processing device 100 executes the out-of-head localization processing. In this embodiment, one of the technical features is processing for generating the inverse filters Linv and Rinv. Hereinafter, processing for generating the inverse filters will be described.

Measurement Device

Figure 2:
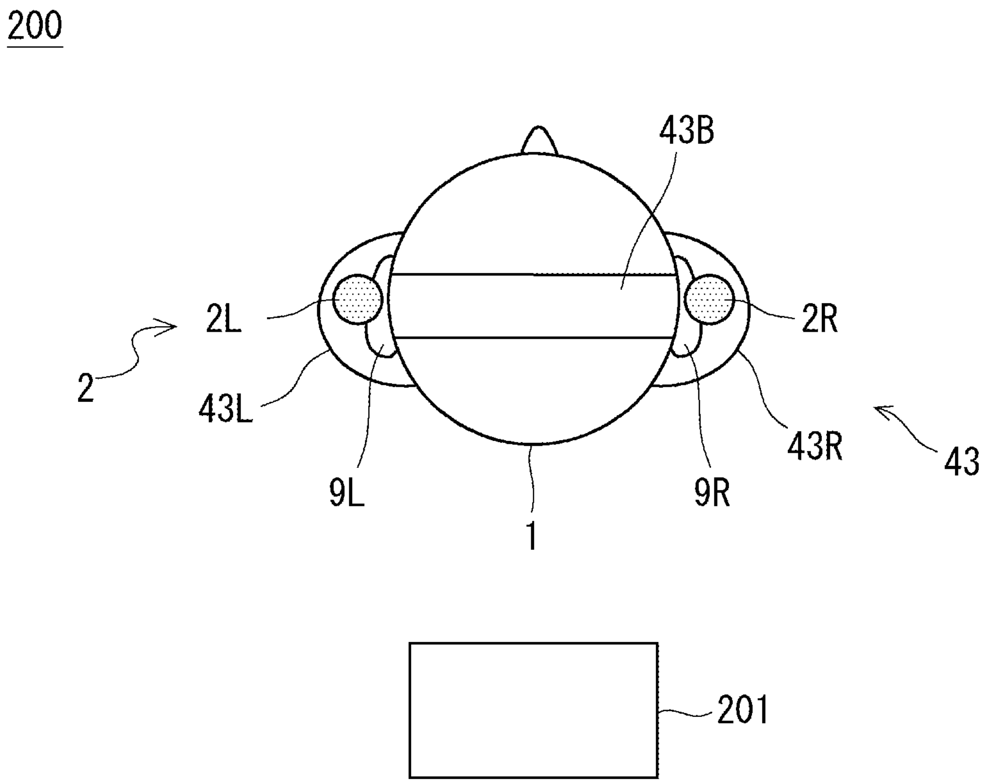
FIG. 2 is a diagram schematically showing a configuration of a measurement device.

The measurement device 200 will be described with reference to FIG. 2. FIG. 2 shows a configuration for measuring transfer characteristics for the user U. The measurement device 200 measures the ear canal transfer characteristics to generate inverse filters. The measurement device 200 includes microphone unit 2, headphones 43, and a processing device 201. Note that the person 1 being measured here is the same person as the user U in FIG. 1, but may be a different person.

In an embodiment, the processing device 201 of the measurement device 200 performs arithmetic processing for appropriately generating the filters according to the measurement results. The processing device 201 is a personal computer (PC), a tablet terminal, a smart phone, or the like, and includes a memory and a processor. The memory stores processing programs, various parameters, measurement data, and the like. The processor executes a processing program stored in the memory. The processor executes the processing program and thereby each process is executed. The processor may be, for example, a CPU (Central Processing Unit), an FPGA (Field-Programmable Gate Array), a DSP (Digital Signal Processor), an ASIC (Application Specific Integrated Circuit), a GPU (Graphics Processing Unit), or the like.

The processing device 201 is connected to the microphone unit 2 and the headphones 43. Note that the microphone unit 2 may be built in the headphones 43. The microphone unit 2 includes a left microphone 2L and a right microphone 2R. The left microphone 2L is worn on a left ear 9L of the user U. The right microphone 2R is worn on a right ear 9R of the user U. The processing device 201 may be the same processing device as or a different processing device from the out-of-head localization processing device 100. Earphones may be used instead of the headphones 43.

The headphones 43 include a headphone band 43B, a left unit 43L, and a right unit 43R. The headphone band 43B connects the left unit 43L and the right unit 43R. The left unit 43L outputs a sound toward the left ear 9L of the user U. The right unit 43R outputs a sound toward the right ear 9R of the user U. The type of the headphones 43 may be closed, open, semi-open, semi-closed or any other type. The headphones 43 are worn on the user U while the microphone unit 2 is worn on the user U. Specifically, the left unit 43L of the headphones 43 is worn on the left ear 9L on which the left microphone 2L is worn; the right unit 43R of the headphones 43 is worn on the right ear 9R on which the right microphone 2R is worn. The headphone band 43B generates an urging force to press the left unit 43L and the right unit 43R against the left ear 9L and the right ear 9R, respectively.

The left microphone 2L picks up the sound output from the left unit 43L of the headphones 43. The right microphone 2R picks up the sound output from the right unit 43R of the headphones 43. Each of microphone parts of the left microphone 2L and the right microphone 2R is placed at a sound pickup position near the external acoustic openings. The left microphone 2L and the right microphone 2R are formed not to interfere with the headphones 43. Specifically, the user U can wear the headphones 43 while the left microphone 2L and the right microphone 2R are placed at appropriate positions of the left ear 9L and the right ear 9R, respectively.

The processing device 201 outputs measurement signals to the headphones 43. As a result, the headphones 43 generate an impulse sound or the like. To be specific, an impulse sound output from the left unit 43L is measured by the left microphone 2L. An impulse sound output from the right unit 43R is measured by the right microphone 2R. The microphones 2L and 2R acquire sound pickup signals at the time of outputting the measurement signals, and thereby impulse response measurement is performed.

The processing device 201 performs the same processing on the sound pickup signals from the microphones 2L and 2R, and thereby generates the inverse filters Linv and Rinv.

Specifically, the processing device 201 performs processing to suppress peaks of the frequency characteristics of the sound pickup signals.

Figure 3:
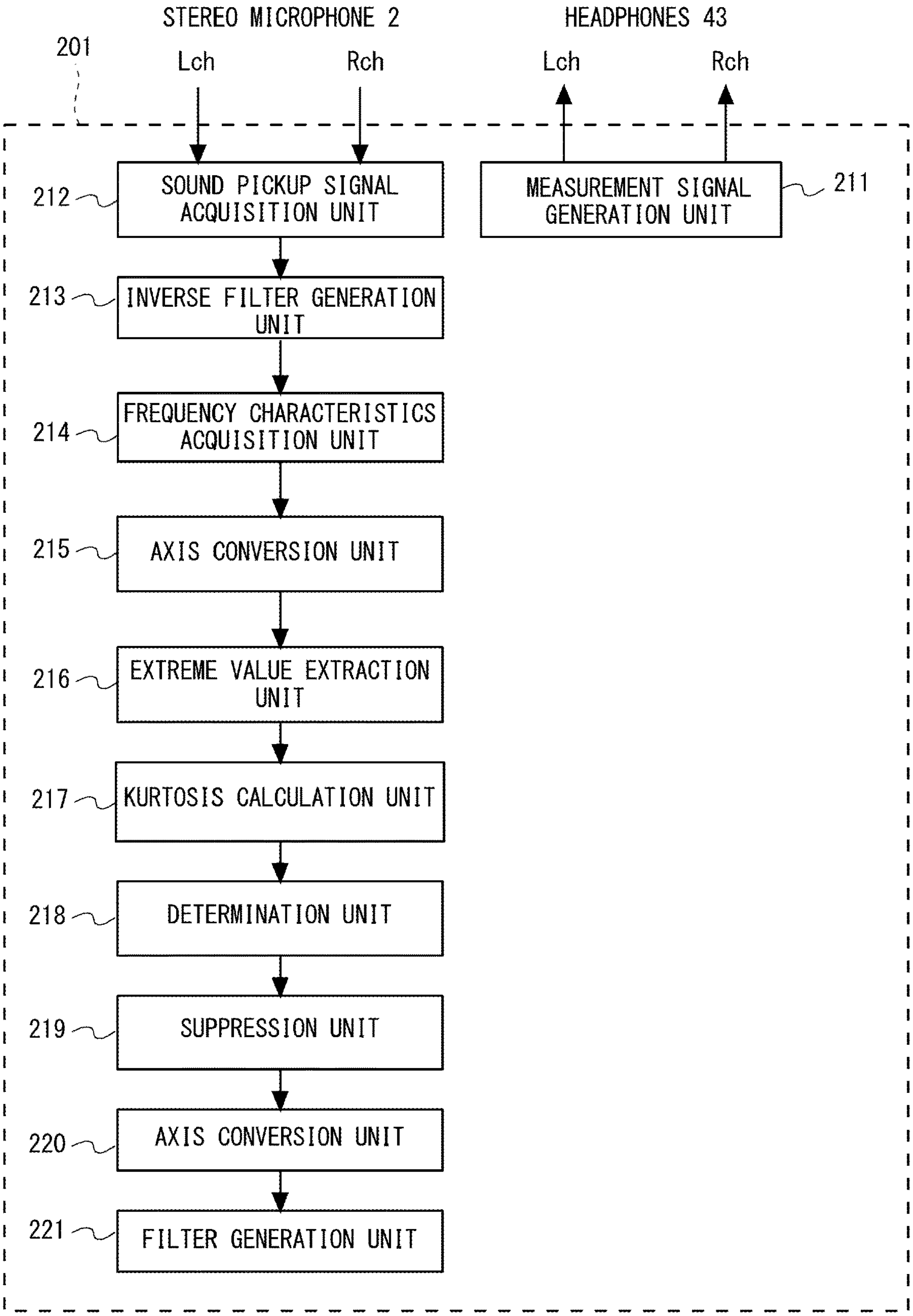
FIG. 3 is a block diagram showing a configuration of a processing device.

Hereinafter, the processing device 201 of the measurement device 200 and its processing will be described in detail. FIG. 3 is a control block diagram showing the processing device 201. The processing device 201 includes: a measurement signal generation unit 211; a sound pickup signal acquisition unit 212; an inverse filter generation unit 213; a frequency characteristics acquisition unit 214; an axis conversion unit 215; and an extreme value extraction unit 216; a kurtosis calculation unit 217; and a filter generation unit 221.

The measurement signal generation unit 211 includes a D/A converter, and an amplifier, and generates a measurement signal for measuring the ear canal transfer characteristics. The measurement signal is, for example, an impulse signal, or a TSP (Time Stretched Pulse) signal. Here, the measurement device 200 performs impulse response measurement, using the impulse sound as the measurement signal.

The left microphone 2L and the right microphone 2R of the microphone unit 2 each pick up the measurement signal and output the sound pickup signal to the processing device 201. The sound pickup signal acquisition unit 212 acquires the sound pickup signals picked up by the left microphone 2L and the right microphone 2R. Note that the sound pickup signal acquisition unit 212 may include an A/D converter that A/D-converts the sound pickup signals from the microphones 2L and 2R. The sound pickup signal acquisition unit 212 may synchronously add the signals obtained by a plurality of measurements. A sound pickup signal in a time domain is referred to as an ECTF.

The inverse filter generation unit 213 generates an inverse filter as an input signal for canceling out the ear canal transfer characteristics based on the sound pickup signal. The inverse filter generation unit 213 calculates the frequency characteristics of the sound pickup signal by discrete Fourier transform or discrete cosine transform. The inverse filter generation unit 213 calculates the frequency characteristics by, for example, performing FFT (fast Fourier transform) on the input signal in the time domain. The frequency characteristics include an amplitude spectrum and a phase spectrum. Note that the inverse filter generation unit 213 may generate a power spectrum instead of the amplitude spectrum.

The inverse filter generation unit 213 obtains inverse characteristics that cancel out the amplitude spectrum. The inverse characteristics are amplitude spectra having filter coefficients that cancels out the amplitude spectra. The inverse filter generation unit 213 calculates a signal in the time domain from the inverse characteristics and the phase characteristics by inverse discrete Fourier transform or inverse discrete cosine transform. The inverse filter generation unit 213 generates a temporal signal by performing IFFT (inverse fast Fourier transform) on the inverse characteristics and the phase characteristics. The inverse filter generation unit 213 calculates an inverse filter by cutting out the generated temporal signal with a specified filter length. The inverse filter generation unit 213 may perform windowing to generate an inverse filter. The inverse filter generation unit 213 outputs the generated inverse filter as an input signal to the frequency characteristics acquisition unit 214.

The frequency characteristics acquisition unit 214 acquires frequency characteristics of the input signal. The frequency characteristics acquisition unit 214 calculates the frequency characteristics of the input signal by discrete Fourier transform or discrete cosine transform. The frequency characteristics acquisition unit 214 calculates the frequency characteristics, for example, by performing FFT (fast Fourier transform) on the input signal in the time domain. The frequency characteristics include an amplitude spectrum and a phase spectrum. Note that the frequency characteristics acquisition unit 214 may generate a power spectrum instead of the amplitude spectrum. This causes the frequency characteristics acquisition unit 214 to acquire the frequency characteristic of the inverse filter that is an input signal.

The axis conversion unit 215 converts the frequency axis of the frequency characteristics acquired by the frequency characteristics acquisition unit 214 by data interpolation. The axis conversion unit 215 changes the scale of the frequency-amplitude characteristics data so that the discrete spectral data are equally spaced on the logarithmic axis. The frequency-amplitude characteristics data (also referred to as gain data) obtained by the frequency characteristics acquisition unit 214 are equally spaced in terms of frequency. In other words, the gain data are equally spaced on the linear frequency axis, and they therefore are not equally spaced on the logarithmic frequency axis. So, the axis conversion unit 215 performs interpolation processing on the gain data so that the gain data are equally spaced on the frequency logarithmic axis.

In the gain data, on the logarithmic axis, the lower the frequency range is, the more sparcely adjacent data are spaced, and the higher the frequency range is, the more densely the adjacent data are spaced. So, the axis conversion unit 215 interpolates the data in the low-frequency band in which the data are sparcely spaced. Specifically, the axis conversion unit 215 determines discrete gain data equally spaced on the logarithmic axis by performing interpolation processing such as three-dimensional spline interpolation. The gain data on which the axis conversion has been performed is referred to as the axis conversion data. The axis conversion data is a spectrum in which the frequencies and the amplitude values (gain values) correspond to each other.

The following describes the reason for converting the frequency axis to a log scale. In general, it is said that the amount of sensitivity of a human is converted to logarithmic values. Therefore, it is important to consider the frequency of the audible sound on the logarithmic axis. The scale conversion causes the data to be equally spaced in the amount of sensitivity, and enables the data to be treated equivalently in all frequency bands. This facilitates mathematical calculation, frequency band division and weighting, enabling them to obtain stable results. Note that the axis conversion unit 215 is only required to convert the spectral data to, without being limited to the log scale, a scale approximate to the auditory sense of a human (referred to as an auditory scale). The axis conversion is performed using an auditory scale such as a log scale, a mel scale, a Bark scale, or an ERB (Equivalent Rectangular Bandwidth) scale.

The axis conversion unit 215 performs scale conversion on the gain data with an auditory scale by data interpolation. For example, the axis conversion unit 215 interpolates the data in the low-frequency band, in which the data are sparcely spaced in the auditory scale, to densify the data in the low-frequency band. The data equally spaced on the auditory scale are densely spaced in the low-frequency band and sparcely spaced in the high-frequency band on the linear scale. This enables the axis conversion unit 215 to generate axis conversion data equally spaced on the auditory scale. Of course, the axis conversion data does not need to be completely equally spaced data on the auditory scale.

Figure 4:
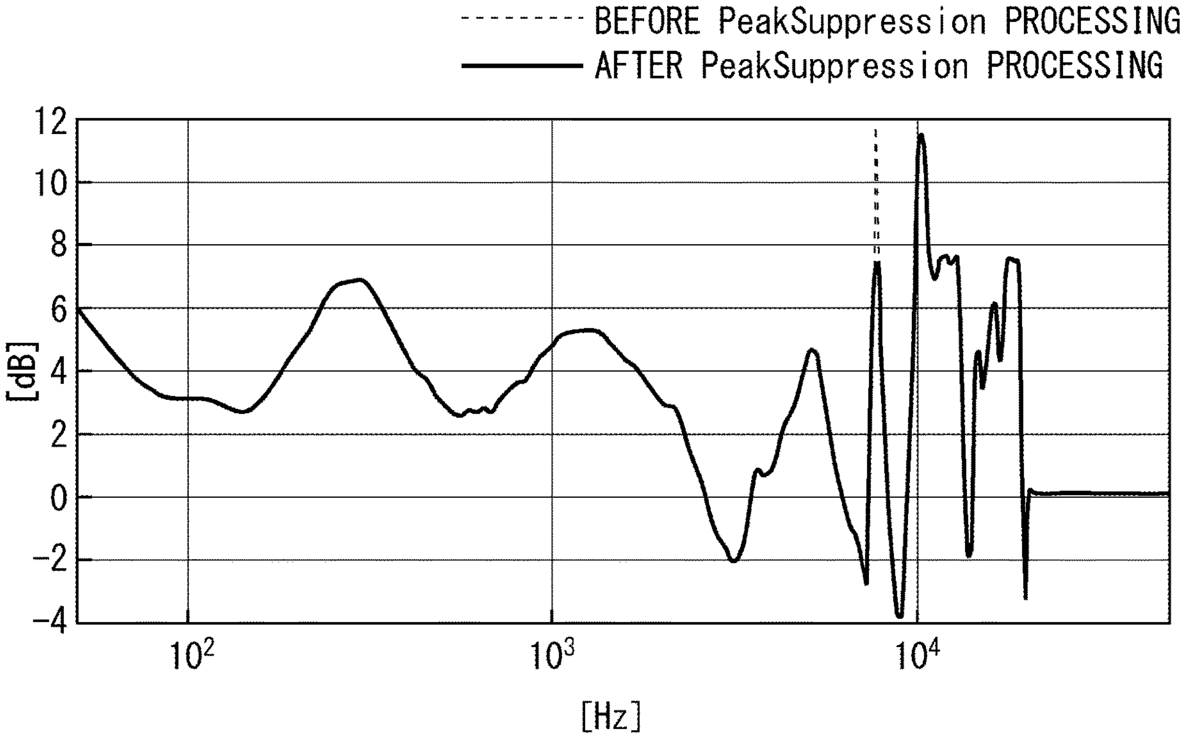
FIG. 4 is a graph showing an example of frequency-amplitude characteristics.

As described above, the axis conversion data has spectral data based on the frequency characteristics of the input signal. FIG. 4 is a graph showing an example of spectral data of axis conversion data. In FIG. 4, the horizontal axis is the frequency [Hz] and the vertical axis is the amplitude value (gain) [dB]. Note that FIG. 4 shows the waveforms of a spectrum before and after the peak suppression processing according to this embodiment.

The extreme value extraction unit 216 calculates the extreme value of the spectral data based on the frequency characteristics. Specifically, the extreme value extraction unit 216 calculates the extreme value of the axis conversion data. The extreme value of the spectral data corresponds to the peak or dip of the spectral data. Specifically, the local maximum value corresponds to the peak and the local minimum value corresponds to the dip.

Figure 5:
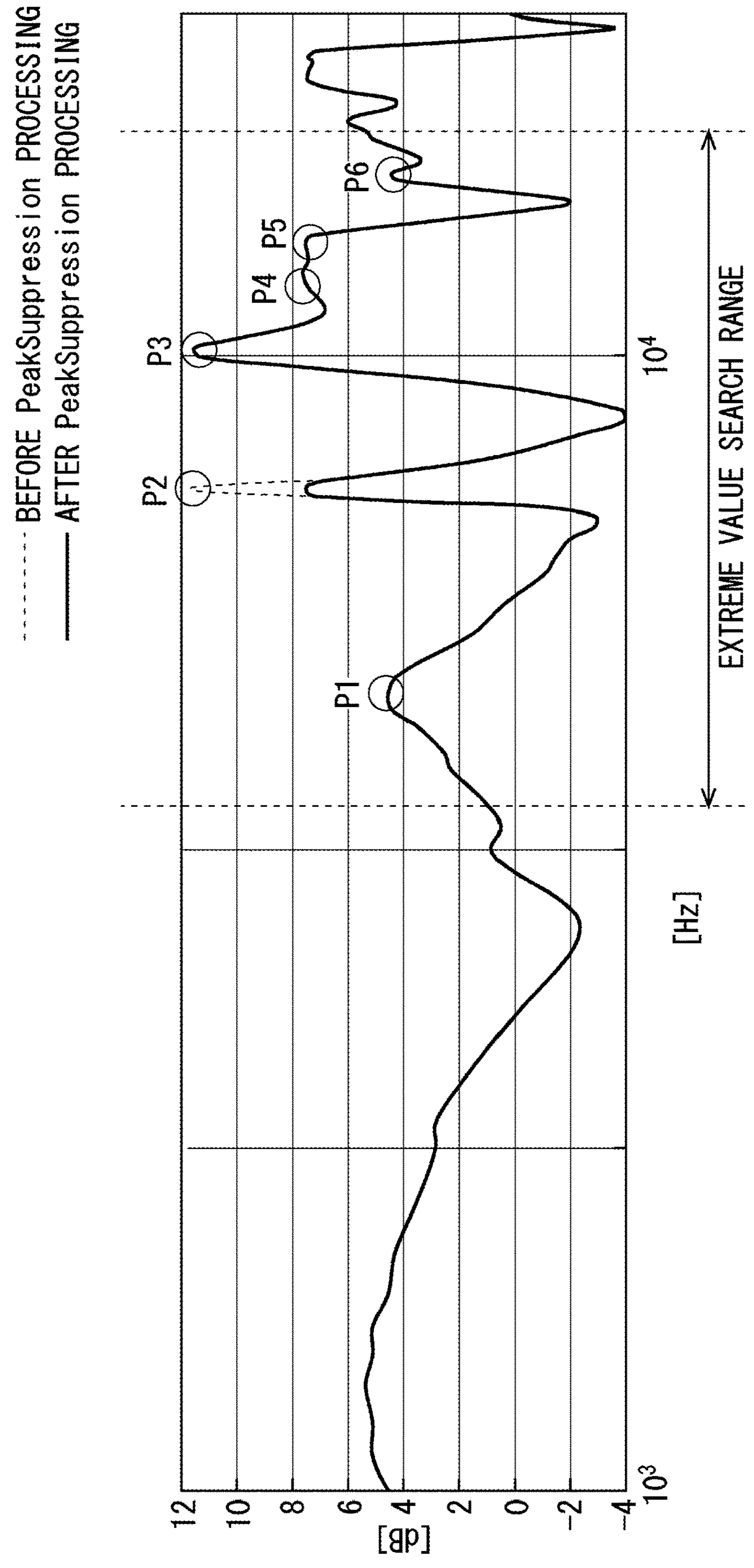
FIG. 5 is a graph showing peaks extracted from a spectrum after axis conversion.

An example in which the extreme value extraction unit 216 calculates the local maximum value (peak) will be described with reference to FIG. 5, although the local minimum value (dip) may be extracted instead. As shown in FIG. 5, the extreme value extraction unit 216 extracts six local maximum values as peaks P1 to P6. Each of the peaks P1 to P6 has data of the peak frequency (the center frequency of the peak, that is, the frequency at the local maximum value) and the gain at the peak frequency.

Further, the extreme value extraction unit 216 may extract the extreme value of the entire band of the frequency spectrum, but may extract the extreme value of only a part of the band. Here, the extreme value extraction unit 216 extracts only the local maximum value of a part of the band of the frequency-amplitude characteristics. As shown in FIG. 5, the extreme value search band to be the target of the suppression processing is set in advance. The extreme value extraction unit 216 searches only peaks in the extreme value search range. In other words, the extreme value extraction unit 216 does not extract the extreme value outside the extreme value search range. Therefore, the peak suppression to be described later is not performed outside the extreme value search range.

Note that, in the above description, the extreme value extraction unit 216 extracts the extreme value of the amplitude spectrum of the axis conversion data, but the extreme value extraction unit 216 may extract the extreme value of the frequency-amplitude characteristics before the axis conversion by the axis conversion unit 215. The spectral data to be processed by the extreme value extraction unit 216 is not limited to the axis conversion data as long as it is spectral data based on frequency characteristics. For example, the extreme value extraction unit 216 may extract the extreme value of the spectrum data obtained by smoothing the frequency characteristics of the input signal or the axis conversion data.

The kurtosis calculation unit 217 calculates the kurtosis of each of the peaks P1 to P6. The kurtosis of a peak is an index showing how steep the peak is. For example, the higher the kurtosis of the peak, the steeper the peak, and the lower the kurtosis of the peak, the broader the peak. Hereinafter, an example of a method for calculating the kurtosis will be described.

In this embodiment, the kurtosis calculation unit 217 calculates the kurtosis using the kurtosis function. The kurtosis function is a function that calculates an evaluation value for evaluating a peak. Specifically, the kurtosis function calculates an evaluation value using a frequency function and a gain function. The evaluation value is a value for evaluating the peak corresponding to the extreme value. Specifically, the evaluation value is a value for evaluating the shape and kurtosis of the peak.

The evaluation value is indicated by the product of the gain function and the frequency function (gain function*frequency function). Then, the kurtosis calculation unit 217 calculates the kurtosis function based on the evaluation value. Specifically, the kurtosis calculation unit 217 determines the kurtosis function by the following expression (1).

$$\text{Kurtosis function}=\max\{\text{gain function*frequency function}\} \quad (1)$$

The gain function and frequency function are calculated for each peak. Hereinafter, an example of calculating the gain function and the frequency function will be described. Note that, in the following description, the position (frequency position) on the frequency axis is indicated in the order of data (integer). For example, in the spectrum of discrete axis conversion data, the order of the data counted from the lowest frequency indicates the frequency position.

The value of the gain function and frequency function of one peak change according to the calculation width Wn. The calculation width Wn is a value indicating a distance from the peak frequency (extreme value). Because the frequency position is represented by an integer, Wn is an integer in the range of 1 or more and Wstd (Wstd is an integer of 2 or more) or less. Wstd is an integer indicating the maximum width (maximum value) of the calculation width Wn. Wstd can be set by the user. Wstd is a parameter related to the frequency width of the peak to be detected. The user may set Wstd based on the maximum width of the peak to be detected.

The frequency at the local maximum value is defined as the peak frequency fp, and the frequency, which is spaced away from the peak frequency fp by the calculation width Wn, is defined as fn. Because the positions of the discrete spectral data on the frequency axis are represented in the order of the data, fn=(fp+Wn) or fn=(fp−Wn). For example, in discrete spectral data, assuming the peak frequency fp is the 1000th data from the low frequency side, and Wn=100, fn=900 or fn=1100.

The kurtosis calculation unit 217 calculates the values of the gain function and the frequency function while gradually changing the calculation width Wn. Specifically, the kurtosis calculation unit 217 changes the calculation width Wn in the order of 1, 2, . . . , Wstd, and calculates the gain function and the frequency function in each calculation width.

An example of the gain function is expressed by the following expression (2).

$$\text{Gain function}=\{(Gp-Gn)/Gstd\}^{\wedge}Gm \quad (2)$$

Gp is the gain [dB] at the peak frequency fp, that is, the gain [db] at the peak (local maximum value). Gn is the gain [dB] at the frequency fn. As the calculation width Wn is changed, the gain Gn changes. Generally, as the calculation width Wn increases, the gain Gn decreases.

Gstd is a parameter (gain reference value) related to the gain intensity to be detected. When Gstd becomes large, low peaks are not detected, and when Gstd becomes small, low peaks are detected as well. However, as Gstd approaches 0, the gain function approaches infinity. This loses the balance between the gain function and the frequency function, requiring caution. Gm is a parameter (gain multiplier) that determines the gain sensitivity of the peak to be detected. When the Gm is increased, the gain function sensitively responds at a position having a large slope of the gain.

Gn is a variable that is changed by changing the calculation width Wn. Gp is a constant value determined for each peak. Gm is a constant value set by the user. For example, Gstd is a constant value determined for each peak when the user determines the maximum width Wstd. Note that Gstd does not need to be a constant value determined for each peak. For example, Gstd may be a value set by the user.

Figure 6:
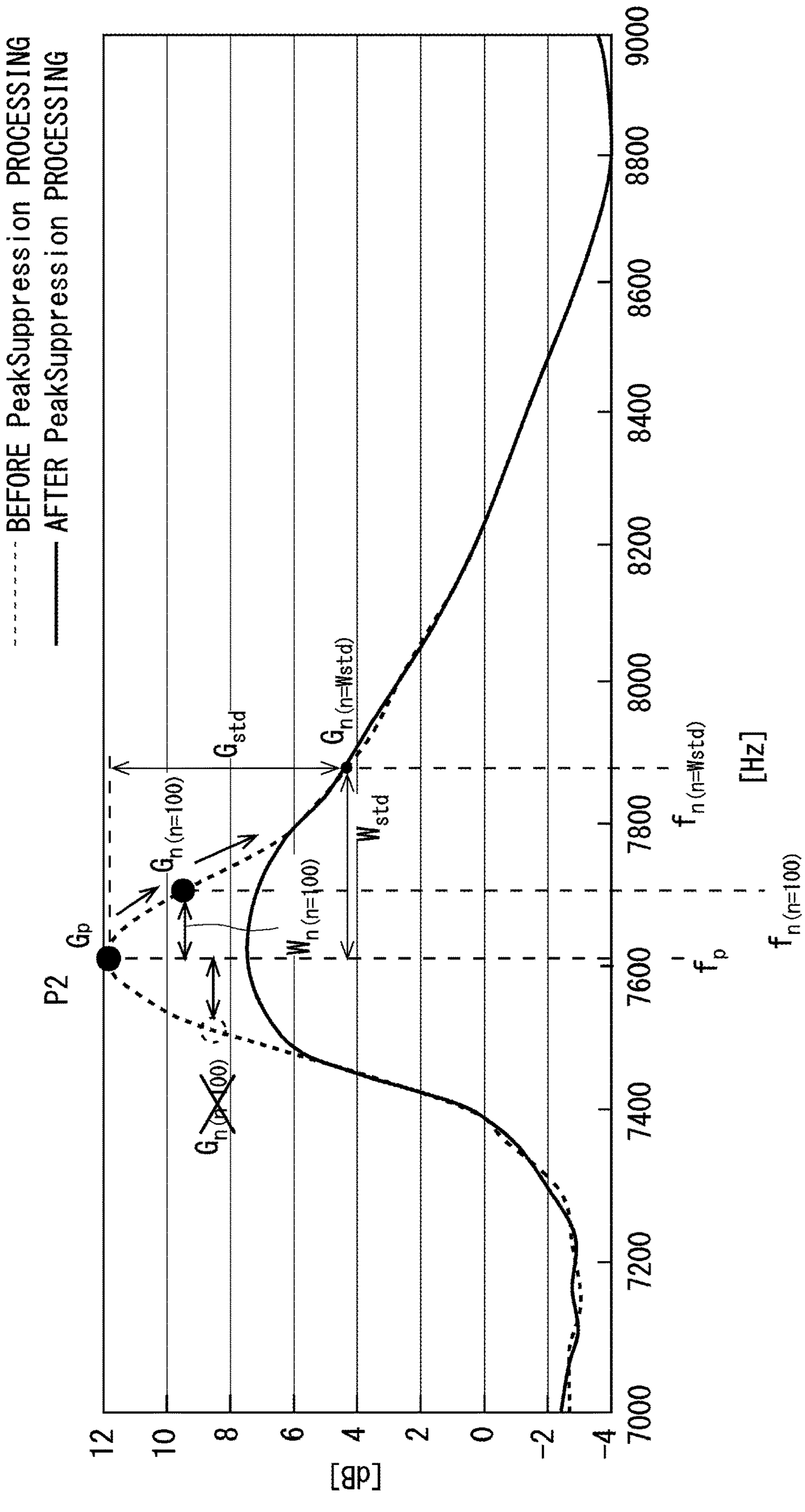
FIG. 6 is a diagram showing an example of processing of calculating kurtosis.

An example of calculation of the gain function will be described with reference to FIG. 6. FIG. 6 shows an example of calculation when Wn=100. FIG. 6 is a diagram showing a spectrum around the peak P2 shown in FIG. 5. As described above, the gain at the peak frequency fp is Gp. Let fn (n=100) be a frequency away from the peak frequency fp by 100 (=Wn). Let Gn (n=100) be the gain at the frequency fn (n=100).

In FIG. 6, fn (n=100)=(fp+Wn). Therefore, the gain at (fp+Wn) is Gn (n=100). In other words, the gain at (fp−Wn) is not used. Whether fn (n=100) is set to (fp+Wn) or (fp−Wn) may be determined by comparing the respective gains. Specifically, of (fp+Wn) and (fp−Wn), the frequency having the larger gain is used as fn (n=100). For example, in FIG. 6, the gain at (fp+Wn) is larger than the gain at (fp−Wn). Therefore, fn (n=100)=(fp+Wn), and the gain is Gn at (fp+Wn).

Similarly, the frequency at the maximum width Wstd is fn (n=Wstd). Let the gain at the frequency fn (n=Wstd) be Gn (n=Wstd). In FIG. 6, fn (n=Wstd)=(fp+Wstd). In other words, the gain at (fp−Wstd) is not used. Therefore, the gain at (fp+Wstd) is Gn (n=Wstd).

Whether fn (n=Wstd) is set to (fp+Wstd) or (fp−Wstd) may be determined by comparing the respective gains. Specifically, of (fp+Wstd) and (fp−Wstd), the frequency having the larger gain is used as fn (n=Wstd). For example, in FIG. 6, the gain at (fp+Wstd) is larger than the gain at (fp−Wstd). Therefore, fn (n=Wstd)=(fp+Wstd), and the gain is the gain Gn (n=Wstd) at (fp+Wstd). Then, Gstd=Gp−Gn (n=Wstd).

An example of the frequency function is shown by the following expression (3).

$$\text{Frequency function}=\{(W\text{std}-Wn)/W\text{std}\}^{\wedge}Wm \quad (3)$$

Wm is a parameter (frequency multiplier) that determines the sensitivity of the calculation width Wn of the peak to be detected. When Wm is increased, the frequency function responds only to a narrow peak. As Wm becomes smaller, the frequency function responds to wide peaks as well. Wm can be constant. Wstd is a parameter related to the frequency width of the peak to be detected. The user needs to set Wstd based on the maximum width of the peak to be detected.

The user can set parameters such as Wm, Gm, Wstd, and Gstd in advance according to the peak shape to be suppressed. In other words, the user adjusts Wm, Gm, Wstd, and Gstd according to how steep the peak to be suppressed is.

The kurtosis calculation unit 217 changes the calculation width Wn and calculates the frequency function and the gain function. The shape of the peak determined to have high kurtosis is determined by the balance between Gm and Wm.

The kurtosis calculation unit 217 changes the calculation width Wn and calculates the frequency function and the gain function. Specifically, the kurtosis calculation unit 217 substitutes the values of the frequency fn corresponding to the calculation width Wn and the gain Gn thereof into the expressions (2) and (3). Here, Wm, Gm, and Wstd are constant values set by the user. When the user sets Wstd, Gstd is determined for each peak. Of course, the user may set the value of Gstd.

Therefore, the kurtosis calculation unit 217 calculates the value of the frequency function and the value of the gain function for a certain calculation width. The kurtosis calculation unit 217, which increments the calculation width Wn by 1 in the range of W1 to Wstd, calculates the value of the Wstd frequency function and the value of the Wstd gain function. In general, when the calculation width Wn is increased, the frequency function becomes smaller and the gain function becomes larger.

The kurtosis calculation unit 217 calculates the product of the frequency function and the gain function as an evaluation value. The kurtosis calculation unit 217 calculates Wstd of evaluation values. As shown in the expression (1), the kurtosis calculation unit 217 determines the maximum value of the Wstd evaluation values to be the kurtosis.

In this way, the kurtosis calculation unit 217 calculates an evaluation value for evaluating the peak from the gain Gn at the frequency fn. Then, the kurtosis calculation unit 217 calculates the kurtosis of the peak based on a plurality of evaluation values calculated in changing the calculation width Wn. Further, the kurtosis calculation unit 217 calculates the kurtosis for each of the peaks P1 to P6. Here, the kurtosis calculation unit 217 calculates six points of kurtosis because six peaks P1 to P6 are extracted.

The determination unit 218 determines whether to suppress the peak for each peak based on the kurtosis. The determination unit 218 compares the kurtosis of the peak with the threshold value, and determines whether to suppress based on the comparison result. When the kurtosis of the peak is equal to or greater than the threshold value, the determination unit 218 determines that the peak is to be suppressed. When the kurtosis of the peak is less than the threshold value, the determination unit 218 determines that the peak is not to be suppressed.

The suppression unit 219 suppresses the peak determined to be suppressed. Specifically, the suppression unit 219 performs suppression processing on a peak having kurtosis equal to or greater than the threshold value. For example, the suppression unit 219 uses a polynomial curve to replace the peak with attenuated characteristics. This can suppress a steep peak.

For example, the suppression unit 219 suppresses the peak by replacing it with a Bezier curve calculated with three points obtained by multiplying both end points of the peak and the local maximum point of the peak by a predetermined attenuation coefficient. This lowers the peak gain. In addition, this method is an example of replacement, and the replacement characteristics are not limited to the calculation result by a Bezier curve. Both end points of the peak can be set, for example, by the calculation width when the evaluation value becomes the maximum value.

Note that the gain of the peak is suppressed in the above description, but the gain of the dip (local minimum value) may be suppressed. In this case, the extreme value extraction unit 216 extracts the local minimum value as a dip. The kurtosis calculation unit 217 needs to calculate the kurtosis for each of the extracted dips. The kurtosis calculation unit 217 can calculate the kurtosis by processing the peak with the positive and negative being reversed. This raises the gain of the dip.

The axis conversion unit 220 performs axis conversion so as to convert the frequency axis of the spectral data having the suppressed peak by data interpolation or the like. The processing in the axis conversion unit 220 is the opposite of the processing in the axis conversion unit 215. The axis conversion unit 220 performs the axis conversion, and thereby returns the frequency axis of the spectrum data to the frequency axis before the axis conversion by the axis conversion unit 215. For example, the axis conversion unit 220 performs processing for returning the frequency axis converted to the log scale to the linear scale by the axis conversion unit 215. The axis conversion unit 220 converts the spectral data with suppressed peaks into data equally spaced on the linear frequency axis. This allows obtaining the frequency-amplitude characteristics of the same frequency axis as the frequency-phase characteristics acquired by the frequency characteristics acquisition unit 214. In other words, the frequency axis (data intervals) of the spectral data of the frequency-phase characteristics become the same as that of the frequency-amplitude characteristics.

The filter generation unit 221 generates a filter using the spectrum data subjected to axis conversion by the axis conversion unit 220. The filter generation unit 221 converts the frequency characteristics indicated by the amplitude spectrum after suppression into a signal in the time domain. Here, the frequency characteristics have frequency-amplitude characteristics and frequency-phase characteristics. The frequency-amplitude characteristics can use the amplitude spectrum after suppression as the frequency-amplitude characteristics. The frequency-phase characteristics can use the frequency-phase characteristics obtained by the frequency characteristics acquisition unit 214.

The filter generation unit 221 generates a filter applied to the reproduced signal based on the spectral data having the peak suppressed by the suppression unit 219. For example, the filter generation unit 221 calculates a signal in the time domain from the frequency-amplitude characteristics and the phase characteristics by inverse discrete Fourier transform or inverse discrete cosine transform. The filter generation unit 221 generates a temporal signal by performing IFFT (inverse fast Fourier transform) on the frequency-amplitude characteristics and the phase characteristics. The filter generation unit 221 calculates a filter by cutting out the generated temporal signal with a specified filter length. The filter generation unit 221 may perform windowing to generate a filter.

The filters generated by the filter generation unit 221 are set in the filter unit 41 and the filter unit 42 in FIG. 1 as an inverse filters. The processing device 201 generates an inverse filter Linv by performing the above processing on the sound pickup signal picked up by the left microphone 2L. The processing device 201 generates an inverse filter Rinv by performing the above processing on the sound pickup signal picked up by the right microphone 2R. The inverse filters Linv and Rinv are respectively set in the filter units 41 and 42 of FIG. 1.

Thus, in this embodiment, the processing device 201 calculates a plurality of evaluation values for one peak with the kurtosis calculation unit 217 by changing the calculation width Wn. Then, the kurtosis calculation unit 217 calculates the kurtosis based on a plurality of evaluation values obtained by changing the calculation width Wn. For example, the kurtosis calculation unit 217 calculates the maximum value of a plurality of evaluation values to be the kurtosis. This can appropriately suppress the peak. Peaks with various shapes can be appropriately evaluated, so that steep peaks can be removed. This can provide stable sound quality and sound field. This can generate a robust filter that does not become unstable when the headphones are reworn.

The ear canal transfer characteristics of the person 1 being measured is measured using the microphone unit 2 and the headphones 43. Further, the processing device 201 can be a smart phone or the like. This may cause measurement settings to differ from measurement to measurement. In addition, variation may arise in how the headphones 43 and the microphone unit 2 are worn. For example, the wearing position of the headphones 43 at the time of measurement may be different from the wearing position of the headphones 43 at the time of listening in the out-of-head localization. The processing device 201 suppresses the peak or dip as described above. This can suppress variations due to measurement and the like, and generate an inverse filter of ear canal transfer characteristics.

The filter generation unit 221 generates a filter using a spectrum corrected to suppress peaks by the suppression unit 219. This can effectively suppress the peaks generated in the inverse filters Linv and Rinv. This allows generating more appropriate inverse filters Linv and Rinv.

Second Embodiment

Figure 7:
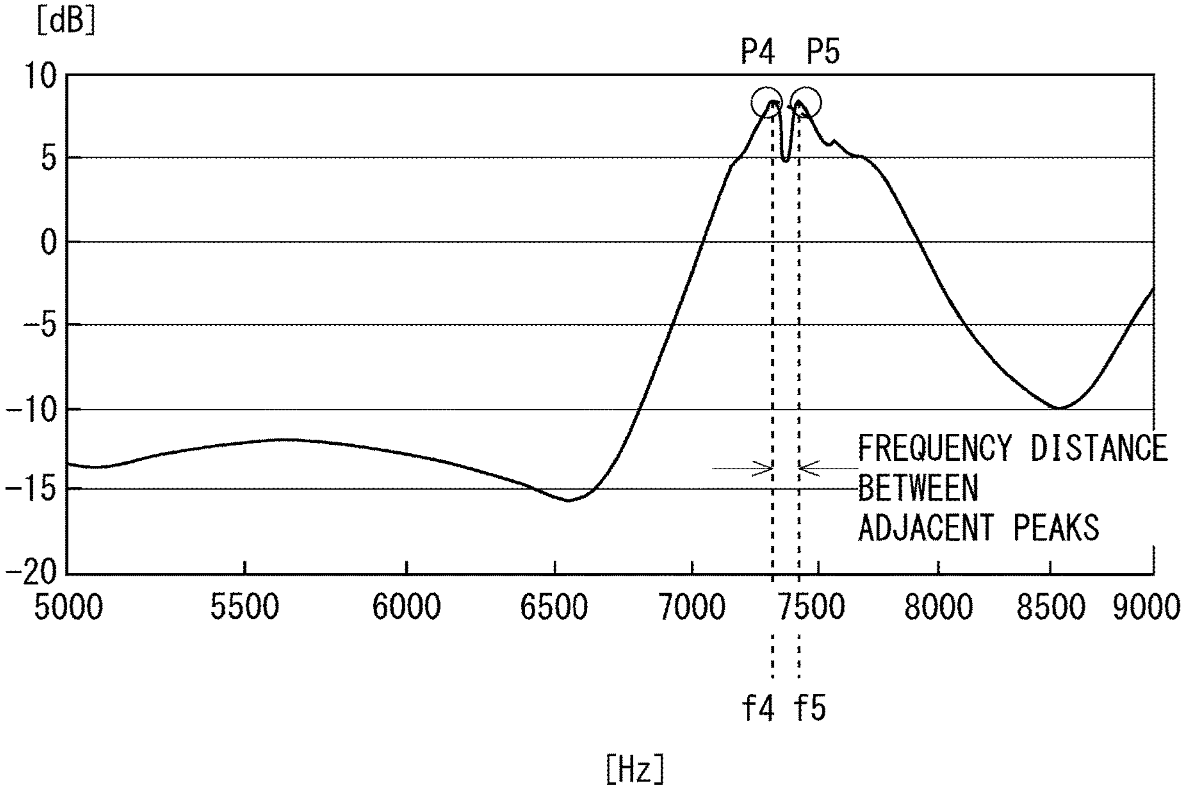
FIG. 7 is a diagram for illustrating processing of merging adjacent peaks in a second embodiment.

A processing device and a processing method according to an embodiment will be described with reference to FIG. 7. FIG. 7 is spectral data for describing processing of this embodiment. Specifically, FIG. 7 is an enlarged graph showing the periphery of two adjacent peaks P4 and P5. The horizontal axis is frequency [Hz], and the vertical axis is amplitude (gain) [dB].

In a second embodiment, a processing of merging two adjacent peaks is added in addition to the processing of the first embodiment. The processing other than the processing of merging is the same as that of the first embodiment, so the description thereof will be omitted.

The processing device 201 calculates a frequency distance between the peaks of the two local maximum values extracted by the extreme value extraction unit 216. The processing device 201 merges two peaks when the frequency distance between the peaks is equal to or less than the frequency threshold value. Specifically, in FIG. 7, the frequency at which the peak P4 has the local maximum value is defined as f4, and the frequency at which the peak P5 has the local maximum value is defined as f5. The frequency distance is (f5−f4). The f5−f4 is represented by an integer indicating the order of data. Further, the frequency distance is a distance on the frequency axis converted by the axis conversion unit 215.

The frequency distance (f5−f4) between the adjacent peaks P4 and P5 is equal to or less than the threshold value. Therefore, the processing device 201 merges the peak P4 and the peak P5 into one peak. The peak frequency of the merged peak may be a frequency between the peak frequency f4 and the peak frequency f5, or may be the same as the peak frequency f4 or the peak frequency f5.

The interpolation method here may be linear interpolation or polynomial interpolation. Of course, interpolation methods may use a method other than linear interpolation or polynomial interpolation. This can appropriately suppress the peak.

Figure 8:
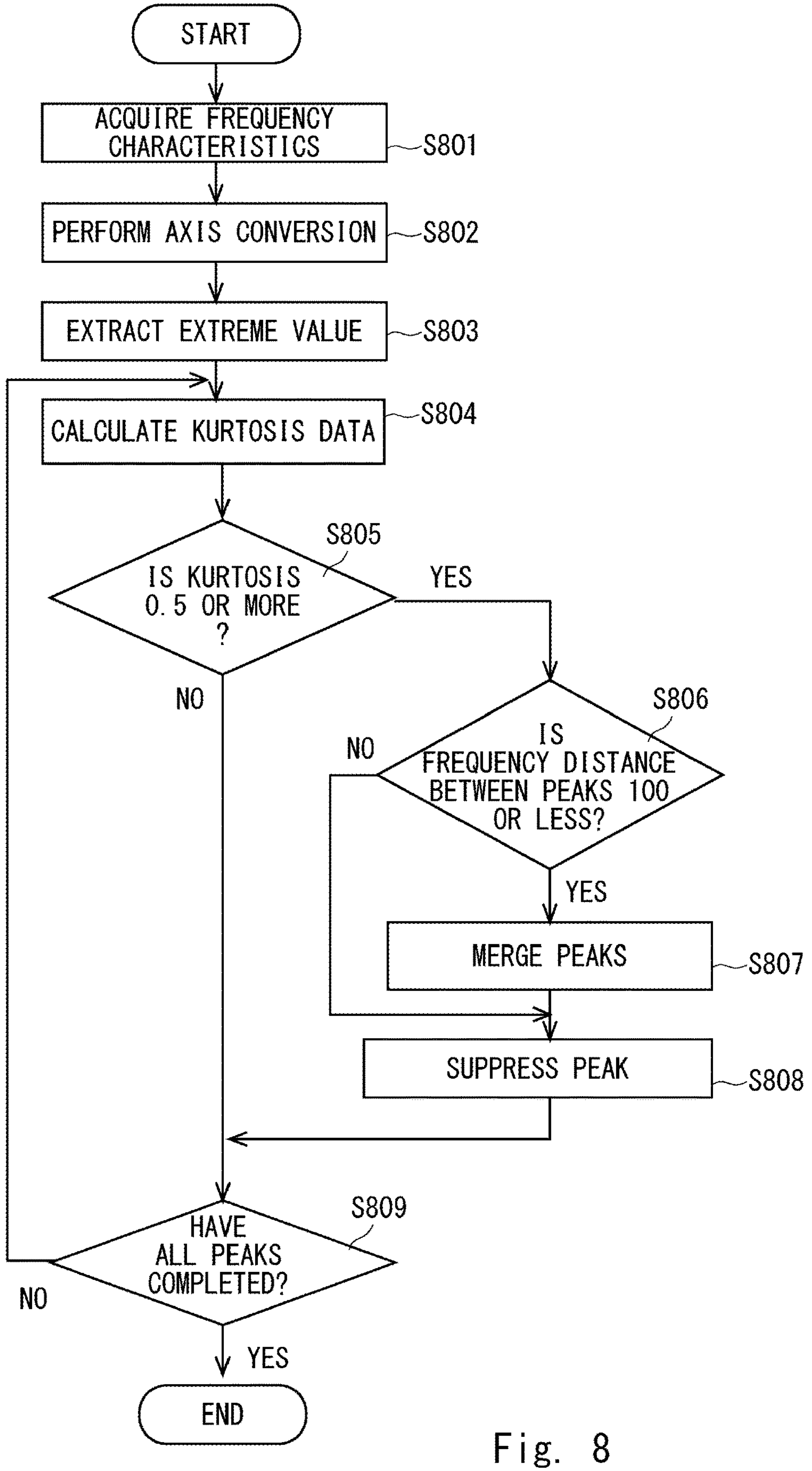
FIG. 8 is a flowchart illustrating a processing method according to an embodiment.

FIG. 8 is a flowchart showing a processing method according to this embodiment. First, the frequency characteristics acquisition unit 214 acquires the frequency characteristics of the input signal (S801). For example, the frequency characteristics acquisition unit 214 converts the input signal in the time domain into signal in the frequency domain by FFT or the like. The input signal is, for example, an inverse filter that cancels out the ear canal transfer characteristics. The axis conversion unit 215 performs axis conversion on the frequency characteristics (S802). This enables obtaining spectral data obtained by converting the frequency axis of the sound pickup signal into a logarithmic axis.

The extreme value extraction unit 216 extracts the extreme value (S803). This extracts the peak corresponding to the local maximum value. Next, the kurtosis calculation unit 217 calculates the kurtosis of the peak (S804). The kurtosis calculation unit 217 calculates the value of the kurtosis function as an evaluation value while changing the calculation width Wn as described above. The kurtosis calculation unit 217 calculates the kurtosis of the peak.

The determination unit 218 determines whether the kurtosis is 0.5 or more (S805). Here, the threshold value of kurtosis is 0.5, but the threshold value is not limited to 0.5. The threshold value is preferably 0.5 or more, and more preferably 0.5 to 0.8. When the kurtosis is less than 0.5 (NO in S805), the processing device 201 determines whether the processing for all the peaks is completed (S809). When the processing for all the peaks has not been completed (NO in S809), the process returns to S804 to repeat the processing. Specifically, the kurtosis calculation unit 217 calculates the kurtosis of the next peak.

When the peak kurtosis is 0.5 or more (YES in S805), the processing device 201 determines whether the frequency distance between the peaks is 100 or less (S806). Here, the frequency threshold value of the frequency distance between the peaks is 100, but the frequency threshold value may be a value other than 100.

When the frequency distance between the peaks is 100 or less (YES in S806), the suppression unit 219 merges the peaks (S807). The suppression unit 219 merges the two peaks into one peak. Then, the suppression unit 219 suppresses the merged peak (S808). When the frequency distance between the peaks is more than 100 (NO in S806), the suppression unit 219 suppresses the peak (S808).

When the suppression unit 219 suppresses the peaks in S808, the processing device 201 determines whether the processing for all the peaks has been completed (S809). When the processing for all the peaks has not been completed (NO in S809), the process returns to S804 to repeat the processing. When the processing for all the peaks is completed (YES in S809), the processing device 201 ends the processing.

This can appropriately suppress the peak. Note that, in the above description, when the kurtosis is equal to or higher than the threshold value and the frequency distance between the peaks is equal to or less than the frequency threshold value, the suppression unit 219 merges the peaks. However, the suppression unit 219 may merge the peaks if the kurtosis is below the threshold value. In other words, when the frequency distance between the peaks is equal to or less than the frequency threshold value, the suppression unit 219 may merge the peaks regardless of the kurtosis. Further, when the processing of merging the two peaks is not performed as in the first embodiment, steps S806 and S807 are omitted.

Other Embodiments

In the first and second embodiments, the processing device 201 suppresses the peak of the spectral data based on the sound pickup signal, but may suppress the dip corresponding to local minimum values. In this case, the processing device 201 extracts the local minimum value and calculates the kurtosis for the dip corresponding to the local minimum value in the same manner. At this time, the processing device 201 performs processing with the positive and negative being reversed.

Further, in the first and second embodiments, the processing device 201 processes the spectral data of the input signals corresponding to the inverse filters of the ear canal transfer characteristics. However, the processing device 201 may process the spectral data based on input signals indicating the spatial acoustic transfer characteristics Hls, Hlo, Hro, Hrs. Further, the processing device 201 generates the out-of-head localization processing filter, but it may generate other filters. For example, the processing device 201 can also generate a noise suppression filter that suppresses peaks or dips. Further, the processing of suppressing peaks or dips can be applied to other than the filter generation. For example, the processing device 201 can also perform noise reduction processing without using a filter.

The out-of-head localization processing device 100 or the processing device 201 is not limited to a physically single device, but it may be distributed to a plurality of devices connected via a network or the like. In other words, the out-of-head localization processing method or processing method according to this embodiment may be carried out by a plurality of devices in a distributed manner.

A part or the whole of the above-described processing may be executed by a computer program. The program described above includes a set of instructions (or software code) for causing the computer to perform one or more of the functions described in the embodiments when loaded into the computer. The program may be stored on a non-transitory computer readable medium or a tangible storage medium. Although examples do not limit the present disclosure, the examples of the computer readable medium or the tangible storage medium includes: memory technology such as random-access memory (RAM), read-only memory (ROM), flash memory, solid-state drive (SSD) or others; an optical disc storage such as a CD-ROM, a digital versatile disc (DVD), a Blu-ray (registered trademark) disc or others; and a magnetic storage device such as a magnetic cassette, a magnetic tape, a magnetic disk storage or others. The program may be transmitted on a transitory computer readable medium or communication medium. Although examples do not limit the present disclosure, the examples of the transitory computer readable medium or the communication medium includes: an electrical, an optical, an acoustic, or another form of propagating signal.

Although the disclosure made by the present inventor has been specifically described above based on the embodiments, it goes without saying that the present disclosure is not limited to the above-described embodiment and can be variously modified without departing from the gist thereof.

While the invention has been described in terms of several embodiments, those skilled in the art will recognize that the invention can be practiced with various modifications within the spirit and scope of the appended claims and the invention is not limited to the examples described above.

Further, the scope of the claims is not limited by the embodiments described above.

Furthermore, it is noted that, Applicant's intent is to encompass equivalents of all claim elements, even if amended later during prosecution.

What is claimed is:

1. A processing device comprising:

a processor coupled to a memory storing instructions to permit the processor to function as:

a frequency characteristics acquisition unit configured to acquire frequency characteristics of an input signal;

an extreme value extraction unit configured to extract an extreme value of spectral data based on the acquired frequency characteristics;

a kurtosis calculation unit configured to: calculate an evaluation value from spectral data in a calculation width including the extreme value; and calculate a kurtosis of a peak or a dip based on a plurality of evaluation values calculated by changing the calculation width, the evaluation value being used for evaluating the peak or the dip corresponding to the extreme value;

a determination unit configured to determine whether to suppress the peak or the dip according to a comparison result between the kurtosis and a threshold value;

a suppression unit configured to suppress the peak or the dip, the peak or the dip having the extreme value determined to be suppressed;

an inverse filter generation unit configured to generate an inverse filter based on a sound pickup signal picked up by a microphone worn on an ear of a person being measured, the inverse filter canceling out ear canal transfer characteristics, the inverse filter serving as the input signal; and a filter generation unit configured to generate a filter based on spectral data having the peak or the dip suppressed by the suppression unit, the filter being applied to a reproduced signal.

2. The processing device according to claim 1, wherein two peaks or two dips are merged when a frequency distance between two local maximum values, or a frequency distance between two local minimum values is equal to or less than a frequency threshold value, the two local maximum values or the two local minimum values being extracted by the extreme value extraction unit.

3. The processing device according to claim 1, wherein the processor is further configured to function as:

a first axis conversion unit configured to convert a frequency axis of frequency characteristics by data interpolation, the frequency characteristics being acquired by the frequency characteristics acquisition unit; and a second axis conversion unit configured to convert a frequency axis of the spectral data by data interpolation, the spectral data having the suppressed peak or the suppressed dip, wherein the filter generation unit generates the filter based on spectral data, the spectral data being subjected to axis conversion by the second axis conversion unit.

4. A processing method comprising:

acquiring frequency characteristics of an input signal;

extracting an extreme value of the acquired frequency characteristics;

calculating an evaluation value from data in a calculation width including the extreme value; and calculating a kurtosis of the extreme value based on a plurality of evaluation values calculated by changing the calculation width, the evaluation value being used for evaluating the extreme value;

determining whether to suppress the extreme value according to a comparison result between the kurtosis and a threshold value;

suppressing the extreme value determined to be suppressed;

generating an inverse filter based on a sound pickup signal picked up by a microphone worn on an ear of a person being measured, the inverse filter canceling out ear canal transfer characteristics, the inverse filter serving as the input signal; and generating a filter based on spectral data having the extreme value that is suppressed, the filter being applied to a reproduced signal.

* * * * *